United States Patent [19]

Bertolini

[11] 4,239,276
[45] Dec. 16, 1980

[54] TRUCK BODY FLOOR CONSTRUCTION AND TIE-DOWN MEANS

[76] Inventor: William A. Bertolini, 115-65 Undercliff Ter., Kinnelon, N.J. 07405

[21] Appl. No.: 887,948

[22] Filed: Mar. 20, 1978

[51] Int. Cl.³ .............................................. B60R 27/00
[52] U.S. Cl. .................................... 296/37.6; 105/422; 410/156
[58] Field of Search ........................ 296/40, 35.1, 37.6; 105/473, 466, 481, 483, 484, 422; 410/156

[56] References Cited
U.S. PATENT DOCUMENTS

| | | | |
|---|---|---|---|
| 2,450,589 | 10/1948 | Falk et al. | 296/40 |
| 4,008,669 | 2/1977 | Simpell | 296/40 |

Primary Examiner—Richard A. Bertsch
Attorney, Agent, or Firm—Max R. Millman

[57] ABSTRACT

A truck body floor construction in which transverse boards of standard length and width with holes pre-drilled in predetermined positions are secured to the side rails having pre-drilled holes in the same predetermined positions, whereby the flooring is self-jigging and the length of the flooring to accommodate different lengths of vehicle bodies can be readily effected by simply adding one or more boards. A novel tie-down means clamps the body to the longitudinal frame rails of a wheeled supporting frame easily and effectively, which means holds the body securely to the frame even when the truck body is subjected to fore and aft stops and sudden starts. This system eliminates the need for cross members and thereby does not necessitate advance information of axle location to provide wheel clearance, since the transverse floor system provides full length clearance.

10 Claims, 5 Drawing Figures

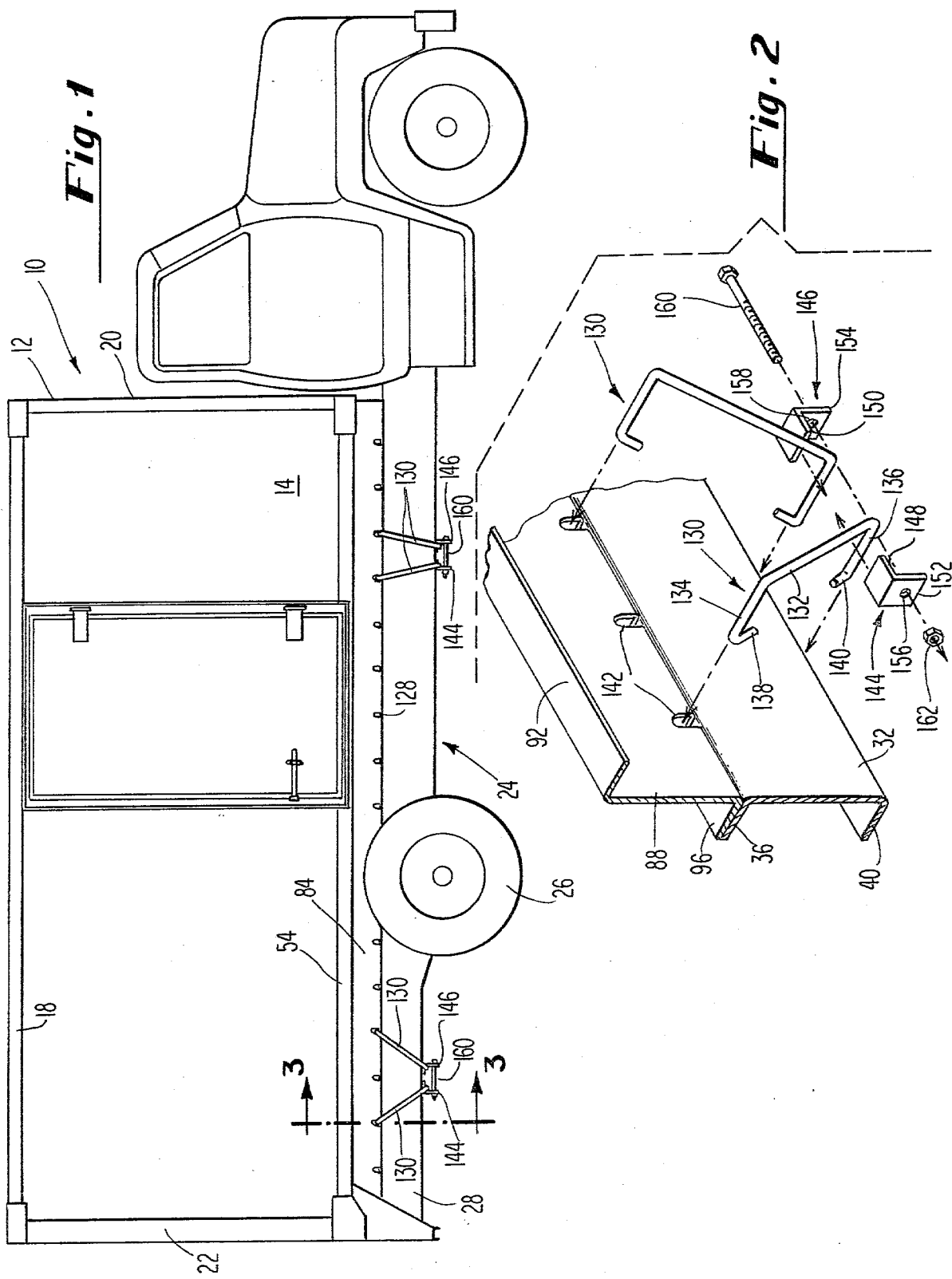

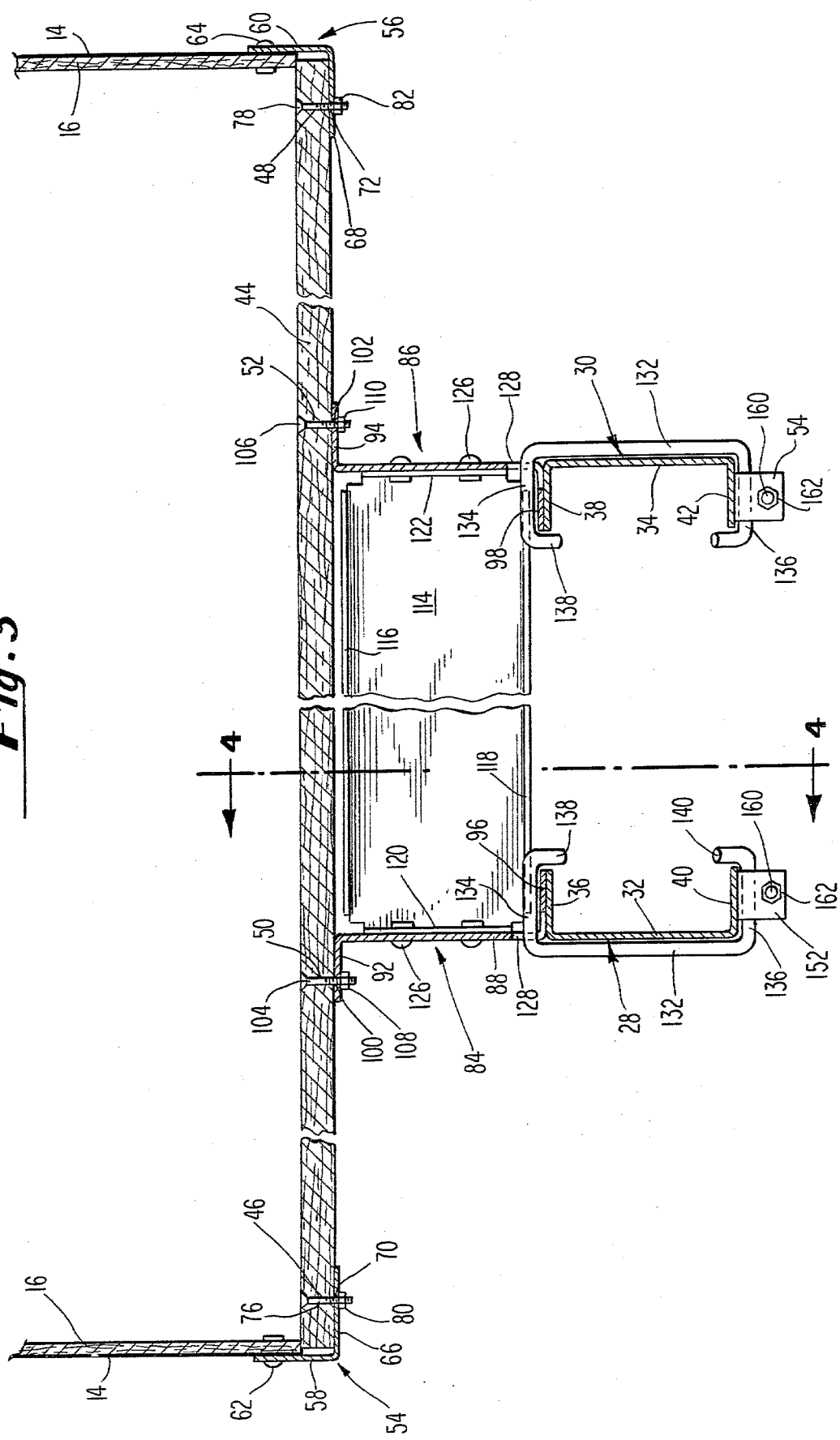

TRUCK BODY FLOOR CONSTRUCTION AND TIE-DOWN MEANS

This invention relates to a truck body floor construction or system and means to tie it down to the truck frame.

Present day conventional truck body construction and tie-down means consist of longitudinal floor boards secured upon transverse cross members which are in turn secured to the side rails and beneath which longitudinal rails are mounted inboard of the side rails which align with the longitudinal truck frame rails and are secured thereto by "U" bolts.

The primary object of the invention is to provide a floor construction made up of transversely extending boards and means to connect them to the side rails and secure them by a novel tie-down means on the truck frame whereby the system, in effect, is self-jigging in that the body will be able to put itself together without fixtures or jigs.

Another object of the invention is to provide a floor construction of the character described in which each transversely extending floor board or plank is of standard dimension, i.e., the length thereof is equal to the width of the truck body and width thereof is also predetermined so that the manufacturer need stock only one size board instead of different board lengths to suit different truck body lengths. The provision of spaced drilled holes in the boards, side rail and tie-down means will allow for ease in increasing the length of the truck body flooring by simply adding and securing in place one or more additional boards.

Another object of the invention is to provide a floor construction and tie-down means of the character described which eliminates the need for the conventional cross members that extend from one side rail to the other and employs instead deeper longitudinal members than those usually provided inboard of the side rails to which the transverse floor boards are secured, which longitudinal body members align with the longitudinal truck frame rails and are readily and easily attached thereto by a clamping means which holds the body securely to the frame when the truck is subjected to fore and aft starts and sudden stops.

Yet another object of the invention is to provide a tie-down means of the character described which is universal in that it can be used to secure any truck model to any conventional support frame.

These and other objects and advantages of the invention will become more apparent as the following description proceeds in conjunction with the following drawings wherein:

FIG. 1 is a side elevational view of a truck embodying the instant invention;

FIG. 2 is a group perspective view, parts shown in section, of the tie-down means;

FIG. 3 is a transverse sectional view taken on the line 3—3 of FIG. 1;

Specific reference will now be made to the drawings in which similar reference characters are used for corresponding elements throughout.

Figure 4:
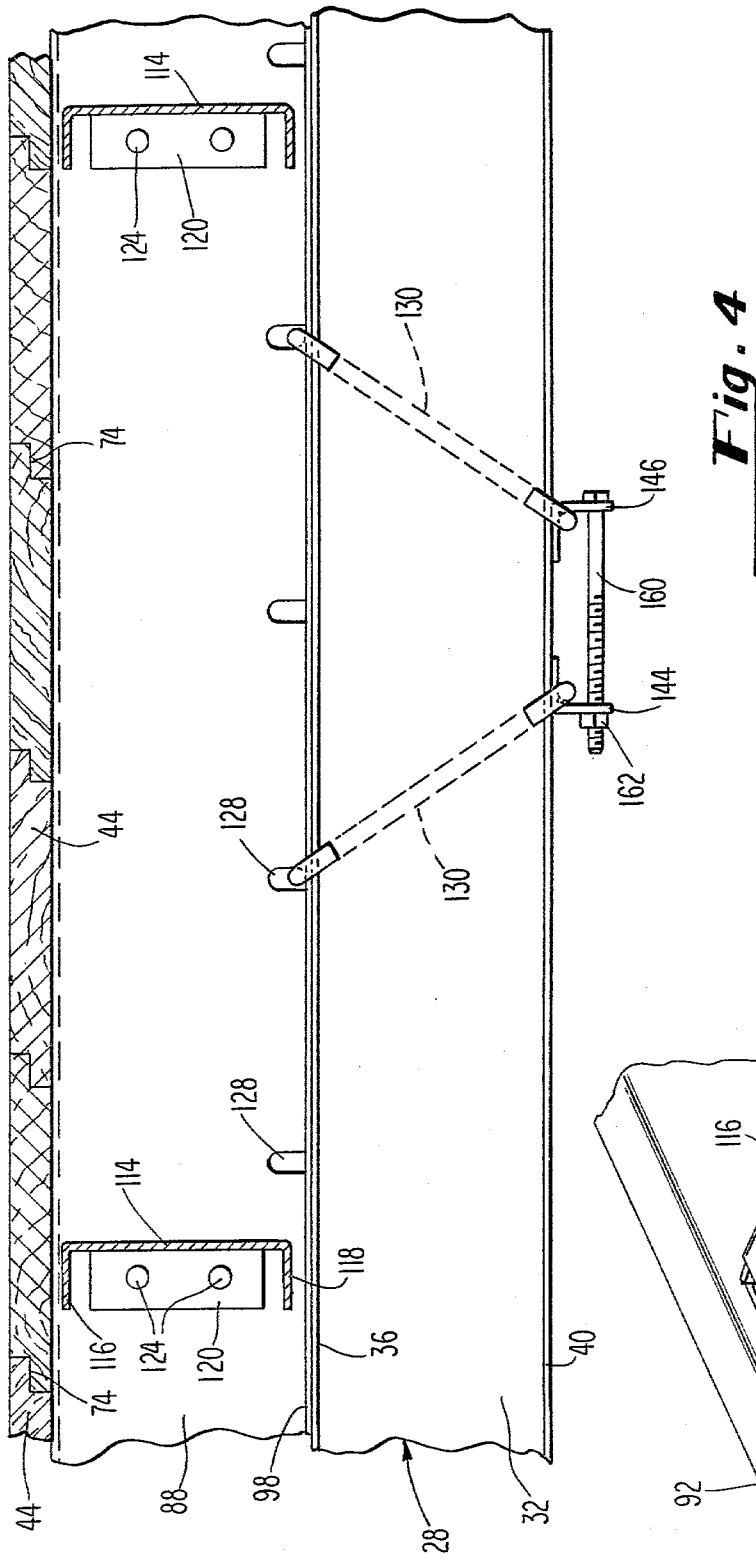
FIG. 4 is a longitudinal sectional view taken on the line 4—4 of FIG. 3.
Figure 5:
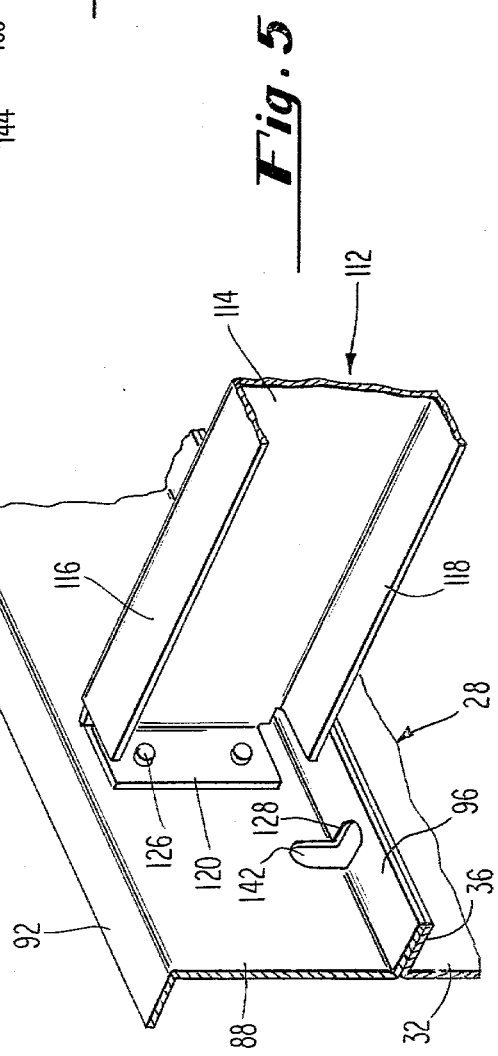
FIG. 5 is a fragmentary perspective showing a detail of construction.

Indicated generally at 10 is a truck body 12 having side walls 14, interior batten 16, steel or aluminum top rails 18 and front and rear frames 20 and 22 of steel or aluminum. The instant invention, combining a novel floor construction and tie-down means, may be applied to conventional truck bodies, truck trailers and intermodal containers made of aluminum, steel or fiberglass reinforced plywood, or to novel truck bodies, truck trailers or intermodal containers whose sidewalls are made of modular panels of steel, aluminum or plastic bonded to plywood and a one-piece continuous roof made of a metal or plastic sheet bonded to plywood as described and claimed in my copending application Ser. No. 887,949 filed concurrently herewith. In the conventional truck body, the floor planks extend longitudinally thereof, consist of laminated hardwood usually 1 ⅜ in. thick and the cross members supporting the floor are made of steel, sometimes aluminum, and are spaced longitudinally from 12 in. to 18 in. apart.

The truck frame 24 to which the wheels 26 are mounted is operatively connected to the motor means, comprises two longitudinal rails 28 and 30 which support the truck body and in the support position are inboard of the sides of the truck body. These rails are U-shaped channels which open inwardly towards each other and include vertical members or webs 32 and 34 having top flanges 36 and 38 and bottom flanges 40 and 42.

The instant flooring comprises wooden floor boards or planks 44 of standardized dimensions, namely, slightly less than 8 ft. long and about 1 ft. wide and each spans the body widthwise from one side thereof to the other. Each plank has four pairs of countersunk holes, two pairs of them 46 and 48 adjacent its ends and two pairs of them 50 and 52 inboard thereof, all pre-drilled at predetermined locations.

The side rails 54 and 56 are right-angular metal members which extend the full length of the truck body and include vertical portions or flanges 58 and 60 which are bolted as at 62 and 64 to the side walls of the body and horizontal portions or flanges 66 and 68 underlying the opposite ends of the boards and which are provided with pre-drilled holes 70 and 72 spaced to align or mate with the board end holes 46 and 48 respectively.

The boards are shiplapped as at 74, or joined by other means, such as tongue and groove, at their longitudinal edges, i.e., transversely of the truck body, and bolts 76 and 78 are extended through the aligned holes 46, 70 and 48, 72 of the boards and horizontal flanges of the side rails and secured in place by appropriate nuts 80 and 82.

Inboard of the sides of the body, two generally Z-shaped members 84 and 86 are provided which extend the full length of the body and have vertical members or webs 88 and 90 which align with the vertical members 32 and 34 of the frame rails, upper outwardly extending flanges 92 and 94 which underlie the floor boards and lower inwardly extending flanges 96 and 98 which abut and rest upon the frame rail upper flanges 36 and 38. The upper flanges 92 and 94 are provided with pre-pierced or drilled holes 100 and 102 which align or mate with the inboard holes 50 and 52 of the floor boards and are secured thereto by bolts 104 and 106 which extend through the holes and receive appropriate closure nuts 108 and 110.

Cross members 112 spaced about 4 ft. to 6 ft. apart extend between and are secured to the Z-shaped members to stabilize and stiffen them. Each cross member includes a vertical web 114, upper and lower flanges 116 and 118 and end flanges 120 and 122. Each cross member is made, preferably of one piece, with the four corners notched out and pre-pierced holes 124 that mate with pre-pierced holes in the vertical webs 88 and 90 of the Z-shaped members, there to be secured by appropriate bolts 126. The cross members 112 are positioned within the confines of the Z-shaped members below the upper and lower flanges thereof and, hence, the floor boards are not secured to them. At the front and rear ends, the Z-shaped members will be secured to the front sill as well as the ICC bumper assembly and the rear sill of the truck body using front and rear closure channels (not shown).

The tie-down means includes longitudinally spaced slotted holes 128 pierced in the Z-shaped members before forming and located where the vertical web 88 joins the lower inwardly facing flange 96. A C-shaped bolt 130 is provided having a vertical portion or web 132, upper and lower legs 134 and 136 and return bends 138 and 140. The height of the vertical portion 142 of the slotted hole 128, that is, the portion cut out of the vertical web 88 of the Z-shaped member, exceeds the length of the return bend 138.

To effect tie-down, as seen in FIG. 2, the upper return bend portions 138 of a pair of C-shaped bolts are extended either through adjacent holes 128, where thick frames are used, or alternate holes where thin frames are used, as seen also in FIG. 1. When the C-bolts are pushed through, the upper leg 134 overlies the lower flange 96 of the Z-shaped member with the upper return bend 138 hooking around the free inner edges of the upper flanges 96 and 36 of the Z-shaped member and frame rail. The lower leg 136 of the C-shaped bolt underlies and is spaced from the lower flange 40 of the frame rail and its return bend 140 hooks around the free edge of the flange 40. The vertical portion 132 of the C-shaped bolt lies adjacent the vertical web 32 of the frame rail.

A pair of right angle clips 144 and 146 are provided having horizontal portions 148 and 150 and vertical portions 152 and 154 which have holes 156 and 158 pierced therethrough. A longitudinal bolt 160 is extended through the holes and, as torque is applied to tighten the nut 162 on the bolt, preferably using an impact wrench, the clips are pulled together along the frame rail thereby pulling the body down, the clips having been assembled as shown in FIGS. 2, 3 and 4 so that the horizontal portions 148 and 150 extend between the lower legs 136 of the C-shaped bolts and the lower flanges 40 and 42 of the frame rails 28 and 30. In the secured position, it will be seen that the C-shaped bolts extend at a downwardly converging angle, as seen clearly on FIGS. 1 and 4. The angular shape of the clips provides both excellent clamping force as well as a strength vector component for fore and aft forces which the conventional "U" bolt system does not provide. Moreover, the combination of the transverse floor construction and tie-down means described are operative independently of the truck axle location since full length wheel clearance is provided for the entire length of the body.

What is claimed is:

1. In a vehicle, a combined floor construction and tie-down means comprising lower longitudinal side rails, longitudinal floor boards extending transversely of the body and secured to said side rails, a wheeled frame including longitudinal inboard frame rails, substantially Z-shaped members secured beneath said floor boards and resting on said frame rails, and means clamping said Z-shaped members to said frame rails wherein said clamping means includes longitudinally spaced holes provided in said Z-shaped members, substantially C-shaped bolts including upper portions extending through a pair of said holes on the same side of said Z-shaped members, said C-shaped bolts having lower portions extending beneath said frame rails, and means securing the lower ends of said C-shaped bolts so that said bolts pull said Z-shaped members against said frame rails and said C-shaped bolts extend at a downwardly converging angle relative to each other.

2. In a vehicle, a combined floor construction and tie-down means comprising lower longitudinal side rails, longitudinal floor boards extending transversely of the body and secured to said side rails, a wheeled frame including longitudinal inboard frame rails, substantially Z-shaped members secured beneath said floor boards and resting on said frame rails, means clamping said Z-shaped members to said frame rails and cross members secured to and between said Z-shaped members to stabilize and stiffen said Z-shaped members.

3. In a vehicle, a combined floor construction and tie-down means comprising lower longitudinal side rails, longitudinal floor boards extending transversely of the body and secured to said side rails, a wheeled frame including longitudinal inboard frame rails, substantially Z-shaped members secured beneath said floor boards and resting on said frame rails, and means clamping said Z-shaped members to said frame rails wherein said Z-shaped members each include upper and lower oppositely extending flanges joined by a vertical web, said frame members each are channel members including upper and lower flanges joined by a vertical web, said floor boards being secured to said upper flanges of said Z-shaped members and said lower flanges thereof resting on said upper flanges of said frame rails, said clamping means embracing said frame rails and said lower flanges of said Z-shaped members.

4. The combination of claim 3 wherein said transversely extending floor boards are secured only to said side rails and said upper flanges of said Z-shaped members.

5. The combination of claim 4 wherein said clamping means includes longitudinally spaced holes provided in said Z-shaped members, substantially C-shaped bolts including upper portions extending through a pair of said holes on the same side of said Z-shaped members, said C-shaped bolts having lower portions extending beneath said frame rails, and means securing the lower ends of said C-shaped bolts so that said bolts pull said Z-shaped members against said frame rails and said C-shaped bolts extend at a downwardly converging angle relative to each other.

6. In a vehicle having a body including lower longitudinal side rails secured to the side walls of the body and including horizontal inwardly extending flanges with spaced holes therein, longitudinal floor boards extending transversely between said side rails and including holes adjacent their ends mating with the holes of said side rail flanges and bolt means extending through said holes, a wheeled frame including a pair of longitudinal inboard frame rails, a pair of longitudinal members in substantial vertical alignment with said frame rails and including upper flanges with longitudinally spaced holes therein, said floor boards including inboard holes mating with said holes in the flanges of said longitudinal members and bolt means extending therethrough, and means clamping said longitudinal members and said frame rails together.

7. In a vehicle including a floor, a wheeled frame including a pair of inboard frame rails having upper and lower flanges, a pair of substantially Z-shaped members in substantial vertical alignment with said frame rails and having upper and lower flanges, means securing said upper flanges of said Z-shaped members to and beneath said floor, said lower flanges of said Z-shaped members resting on said upper flanges of said frame rails and clamping means embracing said frame rails and said lower flanges of said Z-shaped members.

8. The combination of claim 7 wherein said clamping means includes longitudinally spaced holes provided in said Z-shaped members, substantially C-shaped bolts including upper portions extending through a pair of said holes on the same side of said Z-shaped members, said C-shaped bolts having lower portions extending beneath said frame rails, and means securing the lower ends of said C-shaped bolts so that said bolts pull said Z-shaped members against said frame rails and said C-shaped bolts extend at a downwardly converging angle relative to each other.

9. The combination of claim 8 wherein said means securing the lower ends of said C-shaped bolts includes angle clips having horizontal legs extending between said lower portions of said C-shaped members and said frame rails, said angle clips including vertical portions and a bolt extending through said vertical portions.

10. The combination of claim 9 wherein said upper and lower portions of said C-shaped bolts include return bends.

* * * * *